United States Patent [19]
Aiba

[11] 4,359,126
[45] Nov. 16, 1982

[54] METHOD FOR MOUNTING AN EXHAUST SYSTEM IN A MOTORCYCLE

[75] Inventor: Yasuaki Aiba, Sakado, Japan

[73] Assignee: Honda Giken Kogyo Kabushiki Kaisha, Tokyo, Japan

[21] Appl. No.: 188,712

[22] Filed: Sep. 19, 1980

[30] Foreign Application Priority Data

Sep. 19, 1979 [JP] Japan ............................ 54-129831[U]

[51] Int. Cl.³ .............................................. B60K 13/04
[52] U.S. Cl. .................................... 180/219; 180/296
[58] Field of Search ............... 180/225, 219, 229, 296, 180/228

[56] References Cited
FOREIGN PATENT DOCUMENTS

| 1139971 | 2/1957 | France ................................ 180/296 |
| 531478 | 8/1955 | Italy .................................... 180/296 |
| 55-99419 | 7/1980 | Japan .................................. 180/219 |
| 2037678 | 7/1980 | United Kingdom ................ 180/219 |

OTHER PUBLICATIONS

Advertising Brochure, Cleveland Motorcycle Co., Cleveland, Ohio, 1918, p. 7.

*Primary Examiner*—John A. Pekar
*Attorney, Agent, or Firm*—Polster, Polster and Lucchesi

[57] ABSTRACT

The exhaust system in a motorcycle is mounted on the body and fixedly secured at three points, i.e., the front end of the exhaust pipe is connected to an exhaust port of the engine, an intermediate portion of the exhaust pipe is fixed at the rear part of the engine, and a muffler communicatively connected with the exhaust pipe is firmly held by the frame body of the motorcycle.

2 Claims, 4 Drawing Figures

4,359,126

METHOD FOR MOUNTING AN EXHAUST SYSTEM IN A MOTORCYCLE

BACKGROUND OF THE INVENTION

This invention relates to an exhaust system for a motorcycle. More particularly, it is concerned with a method for mounting the exhaust system on the frame body of the mototcycle so that it may be fixedly secured to the motorcycle body.

As shown in FIG. 1 of the accompanying drawing, it has been a usual practice in the manufacture of the motorcycle that an engine 1 is mounted on a frame 2 of the motorcycle body through a plurality of mounting members 3 made of a resilient buffer material with a view to preventing vibrations from the engine 1 in motion from propagating to a motorcycle rider through the frame 2, and that the front end of an exhaust pipe 4 is fixedly secured to an exhaust port 5 of the engine, and a muffler (or mufflers) 6 connected with the exhaust pipe 4 is fixed to the rear part of the frame 2 of the motorcycle body by means of threaded bolts, etc.. In other words, the exhaust system 4, 6 of the engine 1 is generally fixed at two points i.e., at the exhaust port of the engine and the rear part of the motorcycle frame.

In the above-described construction of the two-point support of the exhaust system, the exhaust system 4, 6 is subjected to vibration due to vibration of the engine 1 and vibration of the motorcycle frame 2 per se. In this case, since there is a considerable span of length between the fixed point of the exhaust pipe to the engine 1 and the rear end of the muffler, and the weight of the exhaust system is heavy, the vibrations from the exhaust system is to a considerable extent.

Therefore, in some cases, vibrations from the exhaust system 4, 6 amplifies the vibration from the engine 1, which propagates through the steering handle, foot steps, fuel tank, rearview mirror, and so forth to cause disagreeable feeling to the rider.

Also, at the start of the engine 1, it tends to deflect considerably, on account of which the exhaust pipe 4 is twisted to apprehensively cause a stress at the connected part between the exhaust pipe 4 and the exhaust port 5.

SUMMARY OF THE INVENTION

It is therefore an object of the present invention to provide an improvement in mounting the exhaust system on the frame body of the motorcycle, which has successfully solved the abovementioned point of problem inherent in the conventional exhaust system in the motorcycle.

That is to say, according to the present invention, generally speaking, there is provided a method for mounting an exhaust system in a motorcycle, in which an engine is fixedly mounted on one part of a frame of the motorcycle body through a cushioning member, wherein the front end of the exhaust pipe is fastened to an exhaust port of the engine, an intermediate portion of the exhaust pipe is fixed at the rear part of the engine, and a muffler communicatively connected with the exhaust pipe is firmly held by the frame of the motorcycle.

There has thus been outlined, rather broadly, the more important feature of the present invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception, upon which this disclosure is based may readily be utilized as a basis for the designing of other structures for carrying out the several purposes of the present invention. It is important, therefore, that the claims be regarded as including such equivalent construction so far as they do not depart from the spirit and scope of the present invention.

BRIEF DESCRIPTION OF THE ACCOMPANYING DRAWING

Specific embodiment of the present invention has been chosen for the purpose of illustration and description, and is shown in the accompanying drawing, forming a part of the specification, in which.

DETAILED DESCRIPTION OF PREFERRED EMBODIMENT

Figure 1:
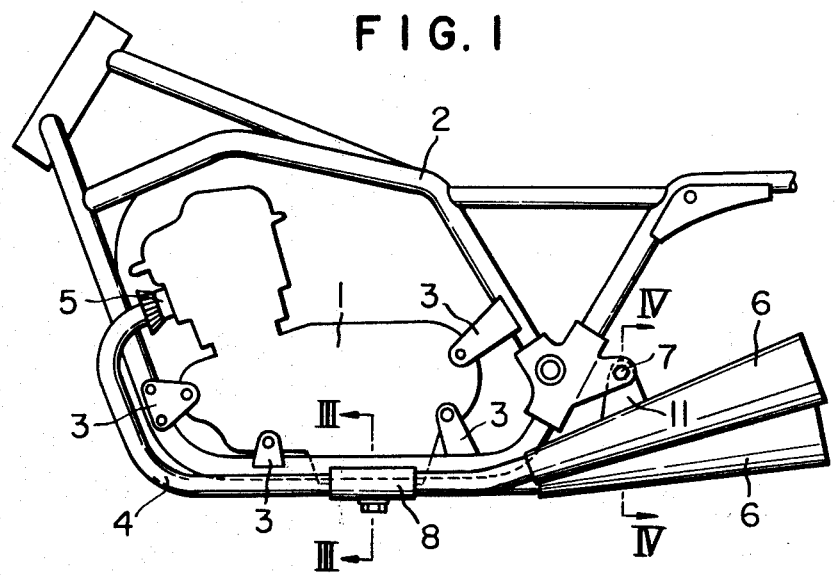
FIG. 1 is a general side elevational view showing the exhaust system for a motorcycle being mounted on the engine and the motorcycle body according to the present invention.
Figure 2:
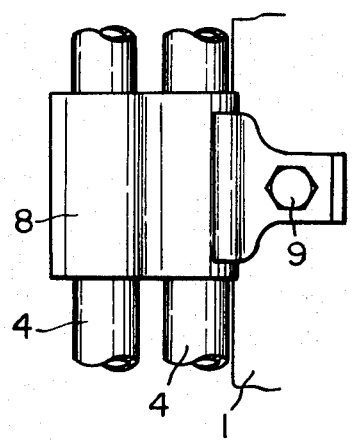
FIG. 2 is a bottom view showing a fitting part of an intermediate portion of the exhaust pipe to the engine.

Referring now to the drawing, the exhaust pipe 4 is shown to be fixedly mounted on the engine 1 at two points, i.e., the one at the exhaust port of the engine 1 and the other at the rear part of the engine 1, where the intermediate portion of the exhaust pipe 4 is situated, through a bracket 8. The bracket 8 is fixed to the bottom, rear part of the engine 1 through a threaded bolt 9.

Further, a muffler 6 is connected with the rear end of the exhaust pipe 4. The muffler 6, as an integral part of the exhaust system, is also fixedly mounted on the rear part of the motorcycle frame to avoid any vibration to be caused thereto.

As the consequence, the exhaust system 4, 6 is to be mounted at three points, i.e., at the exhaust port of the engine, the bottom rear part of the engine, and the rear part of the motorcycle frame. Of these three fixing points, the first two are on the engine 1 itself, which serves to shorten the length of the vibrating portion in the exhaust system, reducing the amount of vibration from the exhaust system without amplifying the vibration from the engine 1, hence feeling of the rider to the vibration during motorcycle cruising can be improved.

Further, by fixing the exhaust pipe to the engine 1 at its front and rear parts, there is no possibility of the exhaust pipe 4 being twisted and of the undesirable stress being developed at the connected part between the exhaust pipe 4 and the exhaust port 5 of the engine 1, hence the exhaust system according to the present invention is excellent in its durability.

Figure 4:
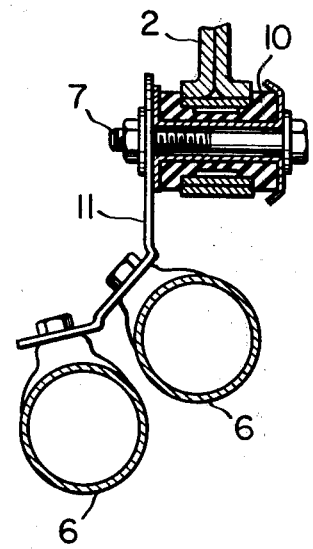
FIG. 4 is an enlarged cross-sectional view taken along a line IV—IV in FIG. 1.
Figure 3:
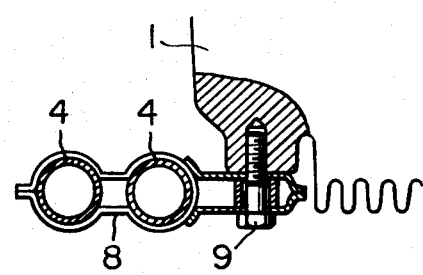
FIG. 3 is an enlarged cross-sectional view taken along a line III—III in FIG. 1.

Incidentally, the fitting part of the muffler 6 to the motorcycle frame 2 may be of such a construction that permits oscillation and axial movement to some extent with a bolt 7 as its center. FIG. 4 particularly shows such structure, wherein a bobbin-shaped rubber bushing 10 is fitted around the bolt 7 so as to increase the abovementioned tolerance. A reference numeral 11 designates a bracket for hanging the muffler 6 on the bolt 7. It should lastly be mentioned that the position of fixing the intermediate portion of the exhaust pipe 4 is not limited to the rear part of the engine 1, but it may be fixed at either a forward part or a middle part of the engine.

What is claimed is:

1. A mounting arrangement of an engine exhaust system in a motorcycle, which comprises a motorcycle frame, an engine mounted on the frame through cushioning means, said engine having an exhaust port at an upper forward part thereof and a bottom rear engine part, and an exhaust system including an exhaust pipe connected at one end thereof with the said exhaust port of the engine and a muffler communicatively connected with the other end of said exhaust pipe, bracket means connecting an intermediate portion of said exhaust pipe to the bottom rear part of the engine, and muffler mounting means for mounting said muffler to the rear part of the motorcycle frame for limited oscillation and movement along its longitudinal axis.

2. The mounting arrangement as set forth in claim 1, wherin said muffler mounting means comprises a bracket hung on said motorcycle frame through a fitting bolt means to be a pivotal point, and a bobbin-shaped rubber bushing fitted on and around said bolt.

* * * * *